(12) United States Patent
Drake et al.

(10) Patent No.: US 7,799,387 B2
(45) Date of Patent: Sep. 21, 2010

(54) ADHESION OF FLUOROSILICONE RUBBER (75) Inventors: Robert Drake, Penarth (GB); Bruno Cuocci, Milan (IT); Fabio Giambelli, Soedio-Lodi (IT)

(73) Assignee: Dow Corning Corporation, Midland, MI (US)

( * ) Notice: Subject to any disclaimer, the term of this patent is extended or adjusted under 35 U.S.C. 154(b) by 275 days.

(21) Appl. No.: 11/914,021

(22) PCT Filed: May 9, 2006

(86) PCT No.: PCT/EP2006/062147

§ 371 (c)(1),
(2), (4) Date: Jun. 25, 2008

(87) PCT Pub. No.: WO2006/120186

PCT Pub. Date: Nov. 16, 2006

(65) Prior Publication Data

US 2008/0308227 A1  Dec. 18, 2008

(30) Foreign Application Priority Data

May 10, 2005  (GB) ................. 0509467.7

(51) Int. Cl.
*B05D 3/02* (2006.01)
(52) U.S. Cl. .................. 427/387; 428/447; 528/15; 528/31; 528/32; 528/42
(58) Field of Classification Search ............. None
See application file for complete search history.

(56) References Cited

U.S. PATENT DOCUMENTS

| 4,332,844 A | 6/1982 | Hamada et al. |
| 4,395,462 A * | 7/1983 | Polmanteer ............ 428/420 |
| 4,465,805 A | 8/1984 | Blizzard et al. |
| 7,507,444 B2 * | 3/2009 | Corveleyn et al. ........ 427/387 |
| 7,572,514 B2 * | 8/2009 | Howe et al. ............ 428/447 |

FOREIGN PATENT DOCUMENTS

| EP | 0542471 A1 | 5/1993 |
| EP | 0798344 A2 | 10/1997 |
| JP | 03-093874 A | 4/1991 |
| JP | 2002-47473 | * 2/2010 |

OTHER PUBLICATIONS

Abstract for JP 2002-47473.*
English language abstract for JP 03-093874 extracted from PAJ database, Sep. 12, 2008.

* cited by examiner

*Primary Examiner*—Marc S Zimmer
(74) *Attorney, Agent, or Firm*—Howard & Howard Attorneys PLLC (57) ABSTRACT

A method for the adhesion of a layer of fluorosilicone rubber which is curable using a non-hydrosilylation curing process to a layer of silicone rubber which contains substantially no perfluoroalkyl groups and which is curable using a non-hydrosilylation curing processes described. The comprises the steps incorporating either a hydrosilylation catalyst or a siloxane containing at least two silicon bonded hydrogen groups into the fluorosilicone rubber composition prior to curing and incorporating the other of the hydrosilylation catalyst or the siloxane containing at least two silicon bonded hydrogen groups into the alternative silicone rubber composition prior to curing; forming the products of step (i) and step (ii) into required shapes; bringing the shaped products of step (iii) into contact with each other; and adhering the shaped products in contact with each other together by effecting a hydrosilylation reaction therebetween.

17 Claims, 1 Drawing Sheet

Fig. 1

ADHESION OF FLUOROSILICONE RUBBER

RELATED APPLICATIONS

This application claims priority to and all the advantages of International Patent Application No. PCT/EP2006/062147, filed on May 9, 2006, which claims priority to Great Britain Patent Application No. GB 0509467.7, filed on May 10, 2005.

The present invention relates to an enhanced method for the adhesion of a fluorosilicone rubber which is curable using a non-hydrosilylation curing process to an alternative silicone rubber which is curable using a non-hydrosilylation curing process and to products made using said method.

Fluorosilicone rubber compositions, particularly those which are based on an organopolysiloxane polymer having a large proportion of fluoroalkyl, particularly perfluoroalkyl groups, when cured, possess properties rendering them resistant to heat, frost, chemicals, and exposure to oil. These compositions are therefore widely used in the automotive and aircraft industries. However, one major problem with cured fluorosilicone rubber is that it does not adhere well to other substrates such as other silicone rubber compositions.

Various methods have been proposed for improving adhesion of fluorosilicone rubbers to alternative silicone rubber based substrates and other substrate surfaces. These include the addition of materials containing multiple silicon-hydrogen bonds or multiple alkenyl groups in either the fluorosilicone rubber and/or other silicone rubber to enhance adhesion. The introduction of adhesion promoters such as cyanurate and/or isocyanurate based compounds for example triallyl cyanurate or triallyl isocyanurate in either the fluorosilicone rubber and/or other silicone rubber may also be used but can result in compatibility problems.

JP 01-38149 describes a method for adhering fluorosilicone rubber to a metal surface by contacting the fluorosilicone rubber composition with a metal surface that has been treated with a primer composition containing vinyltrimethoxysilane and 2,4,4-trimethyl-pentyl-2-hydroperoxide. This composition is then heated and cured. A disadvantage of this method is the cost of the primer composition because it contains a specific organic peroxide. Another disadvantage is the non-uniform adhesion of the fluorosilicone rubber to the substrate.

In EP 0798344 a fluorosilicone rubber composition is provided which incorporates a polyorganohydrogensiloxane having at least two silicon-hydrogen bonds wherein groups other than silicon-bonded hydrogen atoms are represented by substituted or non-substituted monovalent hydrocarbon groups such as $C_1$ to $C_6$ linear and/or branched alkyl groups; alkenyl groups such as vinyl or allyl groups; aryl groups such as phenyl; and 3,3,3-trifluoropropyl groups.

The use of such a compound provides enhanced adhesion to substrates when combined with a primer composition having a main component in the form of an organoalkoxysilane that contains alkenyl groups, and then heating and curing. Other components of the primer compositions include organic titanium acid esters, organic solvents, and platinum compounds. Curing of the fluorosilicone rubber composition, with simultaneous attachment thereof to the substrate surface, is performed by spreading the primer composition over the substrate, drying said primer composition in air for at least 30 minutes, contacting the fluorosilicone rubber composition with the surface of the primed substrate, and then heating and adhering the fluorosilicone rubber to the substrate under a pressure of 100 to 250 kgf/cm² applied for 5 to 20 minutes at a temperature of between 170 to 190° C.

U.S. Pat. No. 4,465,805 describes hydrocarbon liquid resistant fluorosilicones suitable for coating onto substrates.

In a first embodiment of the present invention there is provided a method for the adhesion of a layer of fluorosilicone rubber which is curable using a non-hydrosilylation curing process to a layer of silicone rubber which contains substantially no perfluoroalkyl groups and which is curable using a non-hydrosilylation curing process, comprising the steps of:
  i) incorporating either a hydrosilylation catalyst or a siloxane containing at least two silicon bonded hydrogen groups into the fluorosilicone rubber composition prior to curing and;
  ii) incorporating the other of the hydrosilylation catalyst or the siloxane containing at least two silicon bonded hydrogen groups into the alternative silicone rubber composition prior to curing;
  iii) forming the products of step (i) and step (ii) into required shapes;
  iv) bringing the shaped products of step (iii) into contact with each other; and
  v) adhering the shaped products in contact with each other together by effecting a hydrosilylation reaction therebetween.

In one embodiment of the present invention either the product of step (i) or the product of step (ii) may be pre-cured prior to step (v). Alternatively both the product of step (i) and the product of step (ii) are cured simultaneously with the progress of the hydrosilylation reaction in step (v). If required pressure may be applied when adhering the two products together. The reaction at the interface between the fluorosilicone rubber product and the high consistency silicone rubber product may take place at room temperature or at any temperature from room temperature up to about 200° C.

The fluorosilicone polymer composition utilised in step (i) may be any suitable fluorosilicone rubber composition.

Preferably the fluorosilicone polymer composition comprises the following components
  A) a fluorinated polydiorganosiloxane polymer;
  B) one or more reinforcing and/or non-reinforcing fillers
  C) a suitable non-hydrosilylation cure catalyst Preferably the fluorinated polydiorganosiloxane A has a degree of polymerization greater than 1000, and/or a viscosity of at least 10 000 mPa·s at 25° C. and comprises fluorinated siloxane units, and optionally non fluorinated siloxane units. The fluorinated siloxane units preferably have the formula $$(R''Q)_a(R')_b SiO_{(4-a-b)/2}$$

wherein each R" may be the same or different and denotes a branched or linear fluoroalkyl radical having from 1 to 8 carbon atoms;

each Q may be the same or different and denotes a divalent hydrocarbon containing at least two carbon atoms, a hydrocarbon ether or a hydrocarbon thioether. Each R" radical is linked to a silicon atom via a Q group, each R' is the same or different and denotes an optionally substituted saturated or unsaturated silicon-bonded, monovalent hydrocarbon group, wherein a=0 to 2, b=0 to 2 and when a is 0 at least one R' group per unit contains one or more carbon-fluorine bonds.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as aminofunctional groups, amido-functional groups, and cyano-functional groups; sulphur atoms; and sulphur atom containing groups such as mercapto groups.

Examples of suitable saturated R' radicals include alkyl radicals, such as methyl, ethyl, propyl, isopropyl, butyl, hexyl, 2-ethylhexyl, octyl, isooctyl and decyl. Preferably, when a is >0 at least 90 percent, and more preferably with the exception of alkenyl radicals, all of the R' radicals in the fluorosilicone polymer are methyl radicals. Preferably when a is 0, on average about at least one R''' per unit contains at least one carbon-fluorine bond and most preferably is $CF_3$—.

Preferably R'' denotes a fluoroalkyl radical having from 1 to 8 carbon atoms, over the complete range of from 5 to 100 mol % fluorinated siloxane units. Each fluoroalkyl radical present has at least one —C—F bond. The R'' radicals can be identical or different and can have a normal or a branched structure. Preferably at least some, most preferably at least 50% of the fluoroalkyl groups are perfluoroalkyl groups. Examples thereof include $CF_3$—, $C_2F_5$—, $C_3F_7$—, such as $CF_3CF_2CF_2$— or $(CF_3)_2CF$—, $C_4F_9$—, such as $CF_3CF_2CF_2CF_2$—, $(CF_3)_2CFCF_2$—, $(CF_3)_3C$— and $CF_3CF_2(CF_3)CF$—; $C_5F_{11}$ such as $CF_3CF_2CF_2CF_2CF_2$—, $C_6F_{13}$—, such as $CF_3(CF_2)_4CF_2$—; $C_7F_{14}$—, such as $CF_3(CF_2CF_2)_3$—; and $C_8F_{17}$—.

Although this invention has not been investigated with polymers containing perfluoroalkyl radicals larger than perfluorooctyl, it is reasonable, and within the scope and spirit of the present invention, that R'' can be $C_9F_{19}$—, $C_{10}F_{21}$—, and larger. However, it is clear that polymers containing perfluoroalkyl radicals containing 1 to 8 carbon atoms, depending upon the amount of fluorinated siloxane units in the fluorosilicone polymer, provide excellent results and that the use of larger perfluoroalkyl radicals would only provide incremental improvements at higher cost.

Each perfluoroalkyl radical is bonded to a silicon atom by way of Q, a divalent spacing radical containing carbon, hydrogen and, optionally, oxygen and/or sulphur atoms which are present as ether and thioether linkages, respectively. The sulphur and oxygen atoms, if present, must be bonded to only carbon atoms.

Each Q radical can have any structure containing the elements listed; however, each is preferably an alkylene radical having a normal or branched structure. Examples of suitable alkylene radicals include —$CH_2CH_2$—, —$CH_2CH_2CH_2$—, —$CH(CH_3)CH_2$—, $(CH_2CH_2)_2$— and —$CH(CH_3)CH_2CH_2$— and.

Each fluorinated radical, R''Q, preferably has the formula R''$CH_2CH_2$—.

Optionally the fluorinated polyorganosiloxane additionally comprises a proportion, preferably of less than 25%, more preferably less than 15% of the total number of units per molecule of non-fluorinated siloxane units having the formula wherein R''' denotes an optionally substituted saturated or unsaturated silicon-bonded, monovalent hydrocarbon group, wherein c=0 to 3 but preferably the average value of c is about 2. Each R''' contains no fluorine (and therefore R''' cannot contain any of the fluoro containing substituents mentioned in the general definition of "substituted groups" above.

As previously indicated R''' denotes an optionally substituted saturated or unsaturated silicon-bonded, monovalent hydrocarbon group. Preferably each R''' may be the same or different and are selected from $C_1$ to $C_{10}$ alkyl groups; alkenyl groups such as vinyl or allyl groups; and/or aryl groups such as such as phenyl, tolyl, benzyl, beta-phenylethyl, and styryl. Preferably at least two R''' substituents per molecule are alkenyl groups, most preferably vinyl groups.

In one preferred embodiment of the invention the fluorosilicone polymer contains at least two alkenyl groups having from 2 to 8 carbon atoms, preferably vinyl groups.

Examples of Component A include copolymers of dimethylsiloxy units and (3,3,3-trifluoropropyl)methylsiloxy units; copolymers of dimethylsiloxy units, (3,3,3-trifluoropropyl)methylsiloxy units, and vinylmethylsiloxy units; copolymers of (3,3,3-trifluoropropyl)methylsiloxy units and vinylmethylsiloxy units; and poly(3,3,3-trifluoropropyl)methylsiloxane. The terminal group on the molecular chains thereof being selected from a trimethylsiloxy group, vinyldimethylsiloxy group, dimethylhydroxysiloxy group, and (3,3,3-trifluoropropyl)methylhydroxysiloxy group.

In a further alternative component (A) may be chain extended. Any suitable form of chain extender may be utilised but one particularly preferred for component (A) herein is a chain extended polymer having pendant alkenyl groups only at the location of the chain extension. The alkenyl groups are preferably vinyl groups. Such polymers can be prepared by polymerizing a hydroxyl end-blocked trifluoropropylmethylsiloxane in the presence of an alkylalkenyldi (N-alkylacetamido) silane such as described in EP 0542471, the contents of which are hereby incorporated.

Any suitable filler or combination of fillers (Component (B)) may be utilized. These may include reinforcing fillers alone or in combination with non-reinforcing fillers. Reinforcing fillers include ground silica, fumed silica, precipitated silica, silica aerogels, calcium carbonate. Non-reinforcing fillers include wollastonite, quartz, kaolin, mica, pyrophylite magnesium carbonate and other particulate inorganic solids.

Component (B) may be introduced into the composition in a treated or untreated form. Treated fillers have been pretreated with materials which provide the filler(s) with hydrophobic properties to aid in the filler/polymers mixing process. In some instances it may be beneficial to treat the fillers in situ in which case treating agent will be added to the composition of the present invention during the mixing process. Any suitable treating agent may be utilised. These may include for example one or more of the group comprising silanes, silazanes or short chain organopolysiloxane polymers. Some suitable silanes include, for example, alkyltrialkoxysilanes such as methyltriethoxysilane, methyltrimethoxysilane, phenyl trialkoxysilanes such as phenyltrimethoxysilane, or alkenyltrialkoxysilanes such as vinyltriethoxysilane, and vinyltrimethoxysilane. If desired, silazanes can also be used as treating agents for the kaolin filler, such as hexamethyldisilazane; 1,1,3,3-tetramethyldisilazane; and 1,3-divinyltetramethyldisilazane. Short chain organopolysiloxanes might for example include hydroxy terminated polydimethylsiloxanes having a degree of polymerisation of from 2 to 20, hydroxy terminated polydialkyl alkylalkenylsiloxanes having a degree of polymerisation of from 2 to 20 and organopolysiloxanes comprising at least one Si—H group, which may or may not be a terminal group. Short chain hydroxy terminated poly-3, 3,3-trifluoropropylmethylsiloxanes. Fluoroalkyltrialkoxysilanes and fluoroalkylsilanes may alternatively be utilised as the treating agents.

Preferred fillers are reinforcing fillers such as comprise fumed silica, precipitated silica, including rice hull ash and to a degree calcium carbonate and/or kaolin. Non-reinforcing fillers such as crushed quartz, diatomaceous earths, barium sulphate, iron oxide, titanium dioxide and carbon black, talc, wollastonite may also be used. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite It is preferable that this filler have a pH below 9. Furthermore, for obtaining a sufficient reinforcement effect, the filler must have a specific surface area greater than 50 m$^2$/g. The filler amount is from 5 to 200 parts by weight, and preferably 20 to 80 parts by weight, per 100 parts by weight of component (A). If the amount of the filler exceeds 200 parts by weight, the fluorosilicone rubber will lose its mechanical properties after processing and curing.

Any suitable organic peroxide may be utilized as component (C), of the present invention. Some commonly used organic peroxides include benzoyl peroxide, 1,4-dichlorobenzyl peroxide, 2,4-dichlorobenzyl peroxide, di-t-butyl peroxide, dicumyl peroxide, tertiary butyl-perbenzoate, and monochlorobenzoyl peroxide, ditertiary-butyl peroxide, 2,5-bis-(tertiarybutyl-peroxy)-2,5-dimethylhexane, 1,1-bis(t-butylperoxy)-3,3,5-trimethylcyclohexane, tertiary-butyl-trimethyl peroxide, tertiary-butyl-tertiary-butyl-tertiary-triphenyl peroxide, and t-butyl perbenzoate. The most suitable peroxide based curing agents are benzoyl peroxide, 2,4-dichlorobenzoyl peroxide, di-t-butyl peroxide, and dicumyl peroxide.

This component may also be formed into a paste by dispersing in a silicone oil. It is recommended that component (C) be used in an amount of 0.1 to 10 parts by weight, preferably 0.5 to 2.0 parts by weight, per 100 parts by weight of component (A).

The composition may also comprise 0 to 20 parts of component (D) a second polyorganosiloxane which has a degree of polymerization greater than 1000 and the average unit formula $R^2_b SiO_{(4-b)/2}$, in which $R^2$ is a substituted or non-substituted monovalent hydrocarbon group which may be additionally unsaturated e.g. with alkenyl or alkynyl groups, but does not contain any fluoroinated groups. For example, when component (A) is poly(3,3,3-trifluoropropyl)methylsiloxane, our claimed composition may also be combined with optional component (D) in the form of an organopolysiloxane which has a degree of polymerization greater than 1,000 and which does not contain 3,3,3-trifluoropropyl groups. Organic groups which are bonded to silicon atoms in the polyorganosiloxane are represented by $C_1$ to $C_6$ alkyl groups; vinyl or allyl; and phenyl. The following are specific examples of these polyorganosiloxanes: polydimethylsiloxane, polyvinylmethylsiloxane, a copolymer of dimethylsiloxy units and methylphenylsiloxy units, and a copolymer of dimethylsiloxy units and vinylmethylsiloxy units. It is recommended that the polyorganosiloxanes be used in such an amount that, after compounding, the content of 3,3,3-trifluoropropyl groups in relation to all monovalent hydrocarbon groups bonded to silicon atoms be at least 20 mole %.

The essential ingredients of the fluorosilicone rubber composition of the present invention are components (A), (B), and (C) and optionally (D). If necessary, however, this composition is combined with the following additives: plasticizers such as diorganosiloxane oligomers normally used with silicone rubber compositions; metal soaps or processing aids; iron oxide, titanium oxide, magnesium oxide, magnesium carbonate or oil resistance improvers. Other additional components may be included in the composition in accordance with the invention include chain extenders, dyes, colorants, pigments, viscosity modifiers, bath-life extenders, inhibitors, solvents, fire retardancy agents mould release agents blowing agents, flame retardants, electrically and/or thermally conductive fillers, and desiccants, handling agents, peroxide cure co-agents, acid acceptors, and UV stabilisers and flexibilisers. Suitable fire retardant agents include for example halogenated compounds, phosphates and antimony (III) oxide. Heat stabilisers such as cerium oxide and carbon black may also be used.

The fluorosilicone rubber composition of the present invention may be prepared by any suitable method, such as for example uniformly mixing components (A) to (C) and (D) when present, with appropriate additives when necessary, in conventional mixing equipment such as a two-roll kneader-mixer. Alternatively, It is possible to premix components (A) and (B) by mixing them under heating conditions to obtain a fluorosilicone rubber base compound which is then combined with component (C).

When the resulting composition is cured the applicant has found that such a cured fluorosilicone gives surprisingly improved oil resistance aging results and good adhesion to other cured siloxane rubber substrates.

In one embodiment of the invention the silicone rubber is a high consistency Silicone rubber (HCR) composition having a viscosity of greater than 1000000 mPa·s at 25° C. The silicone rubber although it may alternatively comprise a silicone modified organic rubber comprising any suitable organic rubber such as for example butyl rubber, ethylene vinyl acetate rubber, EPDM, nitrile rubber and the like.

Typically a high consistency silicone rubber composition comprises an organopolysiloxane polymer (A1) having units of the general formula $R_a SiO_{4-a/2}$ wherein each R may be the same or different and denotes a hydrocarbon group having from 1 to 18 carbon atoms, a substituted hydrocarbon group having from 1 to 18 carbon atoms or a hydrocarbonoxy group having up to 18 carbon atoms. Preferably R is an optionally substituted alkyl, alkenyl, aryl, alkaryl or aralkyl group having up to 8 carbon atoms. The alkyl group can be, for example, methyl, ethyl, n-propyl, n-butyl, sec-butyl, and tert-butyl. The alkenyl group can be, for example, vinyl, allyl, propenyl, and butenyl. The aryl and aralkyl groups can be, for example, phenyl, tolyl, and benzoyl. The preferred groups are methyl, ethyl, phenyl and vinyl. Preferably at least 80% of all R groups are methyl or phenyl groups, most preferably methyl. The organopolysiloxanes are preferably those in which the value of a is 2 for practically all units, except for the terminal groups units, and the siloxanes are substantially linear polymers. The viscosity of such organopolysiloxanes may be many millions mPa·s at 25° C., in which case they are typically referred to as gums as they do not readily flow and as such maybe defined in terms of plasticity.

Optionally the silicone rubber composition may comprise a second fluorosilicone rubber composition as described above but which is different in composition from the fluorosilicone rubber described above, i.e. not merely adhering two layers of the same composition together. The components in such a second fluorosilicone rubber composition are in accordance with (A), (B), (C) and optionally (D) above. Whereas preferably the second fluorosilicone rubber composition is preferably different from the composition of the first fluorosilicone rubber composition, they may be the same.

Hence in a further embodiment of the present invention there is provided a method for the adhesion of a first layer of fluorosilicone rubber which is curable using a non-hydrosilylation curing process to a second layer of fluorosilicone and which is also curable using a non-hydrosilylation curing process, comprising the steps of:

i) incorporating either a hydrosilylation catalyst or a siloxane containing at least two silicon bonded hydrogen groups into the first fluorosilicone rubber composition prior to curing and;

ii) incorporating the other of the hydrosilylation catalyst or the siloxane containing at least two silicon bonded hydrogen groups into the second fluorosilicone rubber composition prior to curing;

iii) forming the products of step (i) and step (ii) into required shapes;

iv) bringing the shaped products of step (iii) into contact with each other; and v) adhering the shaped products in contact with each other together by effecting a hydrosilylation reaction therebetween.

It will be appreciated that the concept of the present invention will also work with respect to two layers of silicone rubber (i.e. where both are non-fluorosilicone rubbers).

A high consistency rubber composition in accordance with the above typically additionally comprises a filler (B1) and a suitable catalyst (C1). Typically (B1) and (C1) are the same as components (B) and (C) described above for the fluorosilicone rubber composition. The silicone rubber composition may also comprise any of the optional additives described above with respect to the fluorosilicone rubber composition.

The high consistency silicone rubber composition may be prepared by any suitable method, such as for example uniformly mixing components (A) to (C) and (D) when present, with appropriate additives when necessary, in conventional mixing equipment such as a two-roll kneader-mixer. Alternatively, It is possible to premix components (A) and (B) by mixing them under heating conditions to obtain a fluorosilicone rubber base compound which is then combined with component (C).

It is believed that the adhesion is effected by the interaction of the siloxane containing at least two silicon-bonded hydrogen groups in one of the compositions and the hydrosilylation catalyst at the surfaces in the other composition and that the degree of adhesion is enhanced when the two compositions are brought together in the presence of heat due to migration of the aforementioned species to the surface. The inventors have found that there is no preference as to which of the compositions contain the siloxane containing at least two silicon bonded hydrogen groups (henceforth referred to as component (E) and which composition contains the hydrosilylation catalyst (henceforth referred to as component (F) providing that neither composition contains both the siloxane containing at least two silicon bonded hydrogen groups and the catalyst. Hence, when component (E) is present in the silicone rubber composition, the fluorosilicone rubber to which it is to be adhered contains component (F) and vice versa.

Any suitable siloxane containing at least two silicon bonded hydrogen groups may be used as component (E) in either the fluorosilicone rubber composition or the high consistency rubber composition. The amount of hydrogen atoms bonded to silicon atoms in component (E) is 0.2 weight percent or greater, and preferably 0.4 weight percent or greater. If the amount of silicon-bonded hydrogen atoms silicon-bonded atoms of component (E) is less than 0.2 weight percent, the adhesion to the substrate will be impaired.

In component (E), groups other than silicon-bonded hydrogen atoms are represented by substituted or non-substituted monovalent hydrocarbon groups such as $C_1$, $C_6$ alkyl groups; aryl group such as phenyl; and perfluoro groups such as 3,3,3-trifluoropropyl and/or 1,1,1,2,2,3,3,4,4,-nonafluorohexyl groups. Component (E) normally has a linear or cyclic molecular structure, but it can also be partially branched or three-dimensional. It is recommended that component (E) have a degree of polymerization greater than 5 and preferably within the range of 10 to 150.

The following are Examples of Component (E): polymethylhydrogensiloxane; a copolymer of methylhydrogensiloxy units and dimethylsiloxy units; and a copolymer of methylhydrogensiloxy units, dimethylsiloxy units, and perfluoroalkyl (e.g. 3,3,3-trifluoropropyl and/or 1,1,1,2,2,3,3,4,4,-nonafluorohexyl groups)methylsiloxy units. Terminal groups of the molecular chain of component (E) are represented by a trimethylsiloxy group or a dimethylhydrogensiloxy group. It is recommended that the amount of component (E) be within the range of 0.01 to 10 parts by weight, per 100 parts by weight of the silicone rubber polymer. Component (E) should be free of alkenyl based or acetylenic unsaturation.

Preferably, component (E) when present in the high consistency silicone rubber composition does not contain any fluoro containing groups.

When component (E) is present in the fluorosilicone rubber composition, component (E) may but need not contain perfluoroalkyl groups. However, the presence of perfluoroalkyl groups in component (E) in the fluorosilicone rubber composition may be advantageous as the presence of such groups may make component (E) significantly more compatible with the fluorosilicone rubber composition and provides the added surprising advantage of improved aging after exposure to oil.

Component (E) which optionally contains one or more fluoroalkyl groups may comprise a fluorosilicone polymer containing an average of at least two silicon-bonded hydrogen radicals per molecule Preferably component (E) additionally comprises at least 2 mol %, based on the total number of siloxane units in the fluorosilicone polymer, of fluorinated siloxane units, any remaining siloxane units in the polymer being non-fluorinated siloxane units; said fluorinated siloxane units having the formula $(R''Q)(R^2)_x(H)_e SiO_{(3-x-e)/2}$ and said non-fluorinated siloxane units having the formula $(R^2)_g(H)_d SiO_{(4-g-d)/2}$ where, in said fluorinated and non-fluorinated siloxane units, R'', Q are as defined above and $R^2$ denotes a silicon-bonded, monovalent hydrocarbon radical free of aliphatic unsaturation and x=0 to 2, e=0 to 2, x+e=0 to 2, g=0 to 3, d=0 to 3 and g+d=0 to 3.

Such a fluorosilicone based Component (E) used in the fluorosilicone rubber composition of the present invention is an organopolysiloxane consisting essentially of silicon-bonded hydrogen radicals, fluorinated siloxane units and, optionally, non-fluorinated siloxane units.

In component (E) by fluorinated siloxane units, it is meant siloxane polymer units that bear a perfluoroalkyl radical suitably bonded to a silicon atom. The fluorinated siloxane units have the formula $(R''Q)(R^2)_x(H)_e SiO_{(3-x-e)/2}$, general examples of which include chain-terminating siloxane units having the formula $(R''Q)(R^2)_x(H)_e SiO_{1/2}$, where the sum of x+e is 2, such as $(R''Q)(R')_2 SiO_{1/2}$, $(R''Q)(H)_2 SiO_{1/2}$ and $(R''Q)(R^2)(H)SiO_{1/2}$, chain-extending siloxane units having the formulae $(R''Q)(R^2)SiO_{2/2}$ and $(R''Q)(H)SiO_{2/2}$ and chain-branching siloxane units having the formula $(R''Q)SiO_{3/2}$. Alternatively component C may be $(R''Q)_2(R^2)_x(H)_e SiO_{(1-x-e)/2}$ where x and e are both =0 to 1 and x+e=0 to 1

Each fluorinated radical, R"Q, preferably has the formula R"CH₂CH₂— and in the case of Component E the R" radicals need be no larger than the CF₃CF₂CF₂CF₂-.radical in order to have a fluorosilicone polymer that provides the desirable adhesion properties when cured in the composition of the present invention. Accordingly, the fluorosilicone polymers that are to be used in the curable compositions of this invention preferably contain fluorinated siloxane units delineated above whose R"Q radicals have the structure CF₃CF₂CF₂Q-, and most preferably CF₃CF₂CF₂CF₂CH₂CH₂— or (CF₃)₂CFCH₂CH₂CH₂—

The non-fluorinated siloxane units, if present, have the formula $(R''')_g(H)_dSiO_{(4-g-d)/2}$, general examples of which include chain-terminating siloxane units having the formula $(R''')_g(H)_dSiO_{1/2}$ where the sum of g+d is 3, such as $(R''')_3SiO_{1/2}$, $(R''')_2(H)SiO_{1/2}$, $(R''')(H)_2SiO_{1/2}$ and $(H)_3SiO_{1/2}$, chain-extending siloxane units having the above formula where the sum of c+d is 2, such as $(R''')_2SiO_{2/2}$, and $(R''')(H)SiO_{2/2}$ and $(H)_2SiO_{2/2}$ and chain-branching siloxane units having the above formula where the sum of g+d is 1 or 0, such as $(R''')SiO_{3/2}$, $(H)SiO_{3/2}$ and $SiO_{4/2}$. It is to be appreciated that each $R^2$ and R''' may be the same groups.

As previously discussed $R^2$ denotes a silicon-bonded, monovalent hydrocarbon radical free of aliphatic unsaturation. Preferably each $R^2$ may be the same or different and denotes a silicon-bonded monovalent hydrocarbon radical, preferably having form 1 to 10 carbon atoms. Examples of suitable $R^2$ radicals include alkyl radicals, such as methyl, ethyl, propyl, isopropyl, butyl, hexyl, 2-ethylhexyl, octyl, isooctyl and decyl; aryl, such as phenyl, tolyl, benzyl, beta-phenylethyl, and styryl. Preferably at least 90 percent, and preferably all, of the $R^2$ radicals in the fluorosilicone polymer are methyl radicals.

Although component (E) can have any viscosity up to several million mPa·s (at 25° C.), it is believed necessary that the polymer not be a non-fluid, such as a gel or a solid. Therefore, said chain-branching siloxane units, if present, should be present in only minor amounts.

Specific examples of said selected siloxane units include, but are not limited to $Me_3SiO_{1/2}$, $Me_2HSiO_{1/2}$, $R''QMe_2SiO_{1/2}$, $R''QMeHSiO_{1/2}$, $Me_2SiO_{2/2}$, $MeHSiO_{2/2}$, $R''QMeSiO_{2/2}$ and $R''QHSiO_{2/2}$ where R" is, for example, perfluorobutyl.

General examples of preferred component E when containing fluoro groups include, but are not limited to, the following:

$HMe_2SiO(MeHSiO)_m[R''QSi(Me)O]_fSiMe_2H$

$HMe_2SiO(MeHSiO)_m(R''QHSiO)_fSiMe_2H$

R"QMeHSiO(MeHSiO)_m(R"QHSiO)_fSiMeHRQ

$Me_3SiO(Me_2SiO)_{0.95m}(MeHSiO)_{0.05m}$
$(R''QMeSiO)_fSiMe_3$ $HMe_2SiO(Me_2SiO)_m(R''QMeSiO)_fSiMe_2H$

HMeR"QSiO(R"QMeSiO)_fSiMeR"QH $Me_2R''QSiO(R''QMeSiO)_{0.95f}(R''QHiSiO)_{0.05f}$ and

$Me_3SiO(Me_2SiO)_m(R''QMeSiO)_{0.90f}$
$(R''QHSiO)_{0.10f}SiMe_3$ wherein the viscosity of the polymer ranges from that of a freely flowing liquid to a slowly flowing gum and m and f have values of from zero to 10,000 and more.

Preferably, any fluoro-containing component (E) has a linear structure with silicon bonded hydrogen radicals as represented by the formula $Me_3SiO(Me_2SiO)_r[R''CH_2CH_2Si(Me)O]_t$
$(MeHSiO)_zSiMe_3$ wherein the value of r is zero or greater than zero and the values of t and z are each greater than zero and are such that the fluorosilicone polymer contains from 1 to 95 mol % hydrogen bonded siloxane units, at least 5 mol % fluorinated siloxane units and the balance dimethylsiloxane units and has a viscosity of from 10 to 10000 mPa·s at 25° C.

In the above formulae for the siloxane units, the values of x, e, g and d denote integers, the values of which are as delineated.

The values of m, f, r, t and z for the linear fluorosilicone polymer denote average values, as is well known in the art, and are such that the polymer contains the requisite amount of fluorinated siloxane units and has the desired viscosity at 25° C. The values of m, f, m+f, r, t, z and r+t+z thus will vary greatly, depending on the fluorinated siloxane unit content, the structure of the fluorinated radicals and the viscosity of the polymer. As the mol percent of fluorinated siloxane units in the polymer and/or the size of the fluorinated radicals therein increases, the viscosity of the polymer increases.

While the values of r, t and z can be as small as one, the values of r and t can range to 10,000 and more and the value of z typically is limited to a fraction, such as from ¹⁄₁₀₀ to ²⁄₁₀, of the sum of r+t+z.

Most preferably fluoro-containing component (E) is a trimethylsiloxy terminated methyl perfluoroalkyl methylhydrogen siloxane. Most preferably the perfluoroalkyl group is a perfluorobutylethyl group or the like.

The amount of hydrogen atoms bonded to silicon atoms in component (E) is 0.2 weight percent or greater. If the amount of silicon-bonded hydrogen atoms silicon-bonded atoms of component (E) is less than 0.2 weight percent, the adhesion to the substrate will be impaired. It is recommended that the amount of component (E) be within the range of 0.01 to 10 parts by weight, per 100 parts by weight of component (A). If component (E) is present at less than 0.01 parts by weight, it is not possible to improve curing and adhesion properties.

Hence the fluorosilicone rubber composition when comprising component (E) may comprise
(A) 100 parts by weight of a polyorganosiloxane which has a degree of polymerization greater than 1000 and comprises fluorinated siloxane units, and non fluorinated siloxane units in the polymer; said fluorinated siloxane units having the formula $(R''Q)_a(R')_bSiO_{(4-a-b)/2}$ and said non-fluorinated siloxane units having the formula $(R')_cSiO_{(4-c)/2}$ where, in said fluorinated and non-fluorinated siloxane units, R" denotes a branched or linear perfluoroalkyl radical having from 1 to 8 carbon atoms, Q denotes a divalent hydrocarbon, hydrocarbon ether or hydrocarbon thioether radical linking the R" radical to a silicon atom through at least 2 carbon atoms, R' denotes a saturated or unsaturated silicon-bonded, monovalent hydrocarbon group, wherein a=1 to 2, b=0-2 and c=0 to 3,
(B) 5 to 200 parts by weight of a suitable filler;
(E) a fluorosilicone polymer containing an average of at least two silicon-bonded hydrogen radicals per molecule; and
(C) 0.1 to 10 parts by weight of an organic peroxide.
(D) 0 to 20 parts of a second polyorganosiloxane which has a degree of polymerization greater than 1000 and the average unit formula $R^2_y SiO_{(4-y)/2}$, in which $R^2$ is a substituted or non-substituted monovalent hydrocarbon group which may be unsaturated, but does not contain any fluoro substituents.

The applicants have found that the addition of component (F) in the composition in accordance with the present invention not containing component (E) improves adhesion to the fluorosilicone polymer of the present invention, to the high consistency rubber composition. It is believed that the incorporation of the hydrosilylation catalyst causes a reaction with component (E) resulting in a significant enhancement in the adhesion of the two cured products to each other.

Whilst it is preferred for the polymer containing silicon bonded hydrogen groups are present in the fluorosilicone rubber composition this is not essential and the hydrosilylation catalyst may form part of the fluorosilicone rubber composition and a suitable siloxane compound comprising silicon bonded hydrogen atoms may be provided in the high consistency silicone rubber composition.

Any suitable hydrosilylation catalyst may be utilised. Preferably the hydrosilylation catalyst is a platinum group metal based catalyst selected from a platinum, rhodium, iridium, palladium or ruthenium catalyst. Platinum group metal containing catalysts useful to catalyse curing of the present compositions can be any of those known to catalyse reactions of silicon bonded hydrogen atoms with silicon bonded alkenyl groups. The preferred platinum group metal for use as a catalyst to effect cure of the present compositions by hydrosilylation is platinum. Some preferred platinum based hydrosilylation catalysts for curing the present composition are platinum metal, platinum compounds and platinum complexes. Representative platinum compounds include chloroplatinic acid, chloroplatinic acid hexahydrate, platinum dichloride, and complexes of such compounds containing low molecular weight vinyl containing organosiloxanes. Other hydrosilylation catalysts suitable for use in the present invention include for example rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX_3[(R^3)_2S]_3$, $(R^2_3P)_2Rh(CO)X$, $(R^2_3P)_2Rh(CO)H$, $Rh_2X_2Y_4$, $H_aRh_b olefin_c Cl_d$, $Rh(O(CO)R^3)_{3-n}(OH)_n$ where X is hydrogen, chlorine, bromine or iodine, Y is an alkyl group, such as methyl or ethyl, CO, $C_8H_{14}$ or $0.5C_8H_{12}$, $R^3$ is an alkyl radical, cycloalkyl radical or aryl radical and $R^2$ is an alkyl radical an aryl radical or an oxygen substituted radical, a is 0 or 1, b is 1 or 2, c is a whole number from 1 to 4 inclusive and d is 2, 3 or 4, n is 0 or 1. Any suitable iridium catalysts such as $Ir(OOCCH_3)_3$, $Ir(C_5H_7O_2)_3$, $[Ir(Z)(En)_2]_2$, or $(Ir(Z)(Dien)]_2$, where Z is chlorine, bromine, iodine, or alkoxy, En is an olefin and Dien is cyclooctadiene may also be used.

Component (F) may be added to the present composition in an amount equivalent to as little as 0.001 part by weight of elemental platinum group metal, per one million parts of the composition. Preferably, the concentration of platinum group metal in the composition is that capable of providing the equivalent of at least 1 part per million of elemental platinum group metal. A catalyst concentration providing the equivalent of about 3-50 parts per million of elemental platinum group metal is generally the amount preferred.

Figure 1:
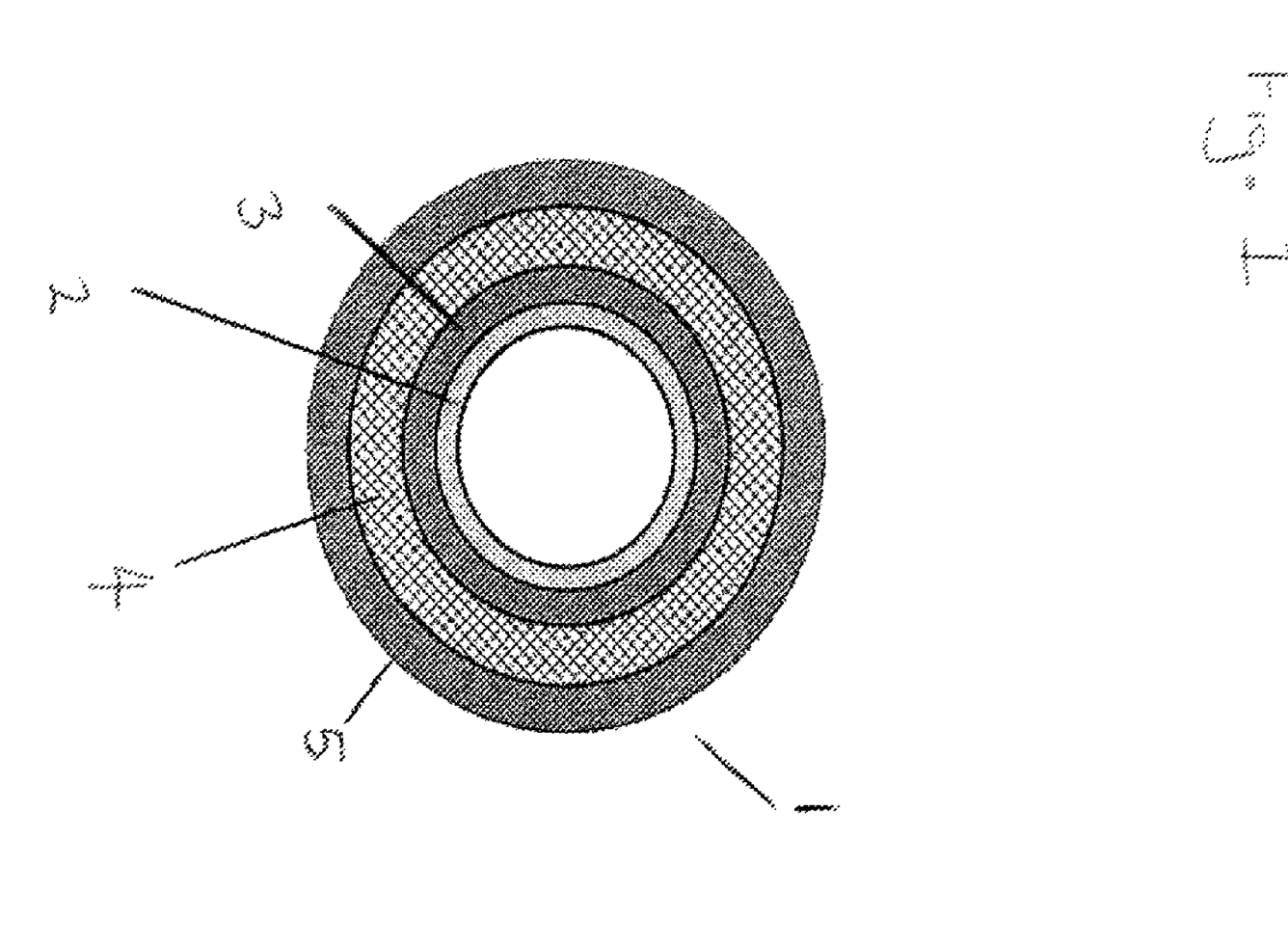

The present application is of use for any purpose requiring adhesion between the two layers above and for fluorosilicone rubber compositions to be used in situations where improved oil resistance properties are required. One application which relates to both of these potential applications is in the preparation of parts for automobiles such as turbocharger hoses. A typical turbocharger hose is depicted in FIG. 1. In FIG. 1 there is provided a turbocharger hose (1) having an inner fluoro-silicone liner (2), a high consistency silicone rubber inner layer (3), a reinforcing layer (4), typically made from a suitable reinforcing fabric such as aramid or the like and a high consistency silicone rubber outer layer (5).

The present invention will now be described with respect to the FIGURE and with the aid of examples:—

EXAMPLES

The fluorosilicone rubber compositions utilised in the following examples comprised the following (all values are given as parts by weight:—

FSR Composition 1

68 parts by weight of hydroxy terminated trifluoropropylmethyl siloxane gum, having a plasticity of from 90 to 140 mils 22 parts by weight of fumed silica 1 part by weight methylvinylbis(n-methylacetamido)silane 1 part by weight calcium carbonate 6 parts by weight of hydroxyterminated trifluoropropylmethyl siloxane 1 part by weight of dimethylvinylsiloxy terminated dimethyl, methylvinyl siloxane 1% by weight of the composition of a paste of 45% 2,5-Dimethyl-2,5-Di(t-butylperoxy)hexane catalyst in silicone oil 1% by weight of the composition of a paste of 45% Cerium oxide in silicone oil FSR Composition 2

68 parts by weight of hydroxy terminated methylvinyl, trifluoropropylmethyl siloxane, having a plasticity of from 100 to 130 mils 24 parts by weight fumed silica filler 6.5 parts by weight of hydroxyterminated trifluoropropylmethyl siloxane 1.5 part by weight of dimethylvinylsiloxy terminated dimethyl, methylvinyl siloxane 1% by weight of the composition of a paste of 45% 2,5-Dimethyl-2,5-Di(t-butylperoxy)hexane catalyst in silicone oil 1% by weight of the composition of a paste of 45% Cerium oxide in silicone oil FSR Composition 3

48 parts by weight of hydroxy terminated trifluoropropylmethyl siloxane gum, having a plasticity of from 90 to 140 mils 22 parts by weight of hydroxy terminated methylvinyl, trifluoropropylmethyl siloxane, having a plasticity of from 100 to 130 mils 20 parts by weight of fumed silica 0.2 parts by weight of hydroxy terminated methyl vinyl siloxane 8 parts by weight of hydroxyterminated trifluoropropylmethyl siloxane 2 part by weight of dimethylvinylsiloxy terminated dimethyl, methylvinyl siloxane 1% by weight of the composition of a paste of 45% 2,5-Dimethyl-2,5-Di(t-butylperoxy)hexane catalyst in silicone oil 1% by weight of the composition of a paste of 45% Cerium oxide in silicone oil The high consistency silicone rubber compositions utilised had the following composition

HCR 1

58 parts by weight dimethylvinyl siloxy terminated dimethyl siloxane gum, having a plasticity of from 55 to 65 mils 13 parts by weight of hydroxy-terminated dimethyl siloxane gum, having a plasticity of from 60 to 70 mils 22 parts by weight of amorphous silica 4.5 parts by weight of hydroxy-terminated dimethyl siloxane, viscosity 21 mPa·s 2 parts by weight of dimethylvinylsiloxy-terminated dimethyl methylvinyl siloxane 1% by weight of the composition of a paste of 45% 2,5-Dimethyl-2,5-Di(t-butylperoxy)hexane catalyst in silicone oil

HCR 2

72.6 parts by weight dimethylvinyl siloxy terminated dimethyl siloxane gum, having a plasticity of from 55 to 65 mils 0.2 parts by weight of hydroxy-terminated dimethyl methylvinyl siloxane having a viscosity of 20 mPa·s 3 parts by weight of hydroxy-terminated dimethyl siloxane having a viscosity of about 21 mPa·s 24 parts by weight of fumed silica 0.4 parts by weight of hydrogen-terminated dimethyl siloxane having a viscosity of 11 mPa·s 1% by weight of the composition of a paste of 45% 2,5-Dimethyl-2,5-Di(t-butylperoxy)hexane catalyst in silicone oil Unless otherwise indicated the platinum catalyst comprised 0.5% by weight of the composition of 1,3,-diethenyl-1,1,3,3-tetramethyldisiloxane complexes of platinum.

Sample Preparation

Unless described to the contrary, all samples used in the adhesion tests described in the Examples below were made using the following process:—

Uncured slabs having dimensions of 150×150×2 mm of fluorosilicone rubber and high consistency rubber were pressed out. These were then coupled together whilst inserting a PET sheet between the layers at one end to allow separation after cure. The coupled sheets were then cured in a 4 mm deep mould for 20 minutes at 170° C. 10 mm strips were then cut using a suitable cutting tool and the resulting test samples were analysed for the level of adhesion between the two layers.

The Adhesion Test

Samples prepared in Examples 1 to 4 were subjected to a 180° peel test using a Lloyd tensiometer at a crosshead speed of 50 mm min$^{-1}$.

Example 1

In this example uncured and pre-shaped fluorosilicone rubber (FSR) and high consistency rubber (HCR) samples were combined together before curing using the above sample preparation process such that the samples of each compound were cured and adhered to each other in accordance to one embodiment of the invention simultaneously. The cross-linker used was 1% by weight of the composition weight of methyl(perfluorobutylethyl), methyl hydrogen siloxane having a viscosity of about 35 mPa·s at 25° C. When present, the cross-linker was added to the fluorosilicone rubber composition and the platinum catalyst was incorporated into the high consistency rubber composition.

TABLE 1

| FSR Composition | FSR Cross-Linker (1) | HCR | +Pt catalyst | Peel Force N/mm (Average) |
|---|---|---|---|---|
| 1 | No | HCR 1 | No | 0.50 |
| 1 | No | HCR 1 | Yes | 0.50 |
| 1 | Yes | HCR 1 | No | 1.09 |
| 1 | Yes | HCR 1 | Yes | 1.93 |
| 2 | No | HCR 1 | No | 0.36 |
| 2 | No | HCR 1 | Yes | 0.40 |
| 2 | Yes | HCR 1 | No | 1.18 |
| 2 | Yes | HCR 1 | Yes | 2.08 |
| 3 | No | HCR2 | No | 0.28 |
| 3 | Yes | HCR2 | Yes | 1.73 |

It will be seen in Table 1 that the adhesion of all samples containing the cross-linker in the fluorosilicone layer gave significantly higher peel force test results with those in contact with high consistency rubber layers containing a platinum catalyst being significantly better than when the platinum catalyst was omitted.

Example 2

Exactly the same processes were undertaken to prepare and measure samples as described above. The only difference in this example was the use of an alternative cross-linker, referred to in Table 2 as FSR cross-linker (2). FSR cross-linker (2) was a dimethylhydrogensiloxy terminated trifluoropropyl silsesquioxane having a viscosity of about 5 mPa·s at 25° C.

TABLE 2

| FSR | FSR Cross-linker (2) | HCR | +Pt catalyst | Peel Force N/mm (Average) |
|---|---|---|---|---|
| 1 | No | HCR 1 | No | 0.50 |
| 1 | Yes | HCR 1 | Yes | 1.68 |
| 1 | No | HCR2 | No | 0.50 |
| 1 | Yes | HCR2 | Yes | 1.32 |
| 2 | No | HCR 1 | No | 0.36 |
| 2 | Yes | HCR 1 | Yes | 1.90 |

Again as seen in Table 1, it will be seen in Table 2 that the adhesion in all samples containing the cross-linker in the fluorosilicone layer gave significantly higher peel force test results with those in contact with high consistency rubber layers containing a platinum catalyst being significantly better than when the platinum catalyst was omitted.

Example 3

Exactly the same processes were undertaken to prepare and measure samples as described above. The only difference in this example was the use of an alternative cross-linker, referred to in Table 3 as cross-linker (3). Cross-linker (3) was a trimethylsiloxy terminated polymethylhydrogen siloxane having a viscosity of about 30 mPa·s at 25° C.

TABLE 3

| FSR | +Cross-linker (3) | HCR | +Pt catalyst | Peel Force N/mm (Average) |
|---|---|---|---|---|
| 2 | No | HCR 1 | No | 0.36 |
| 2 | Yes | HCR 1 | Yes | 1.57 |

The results clearly show improved adhesion in the presence of crosslinker 3

Example 4

Exactly the same processes were undertaken to prepare and measure samples as described above. The only difference in this example was the use of an alternative cross-linker, referred to in Table 3 as cross-linker (3). Cross-linker (3) was a trimethylsiloxy terminated polymethylhydrogen siloxane having a viscosity of about 30 mPa·s at 25° C. with the crosslinker being added to the high consistency silicone rubber (HCR) composition and the Pt catalyst being added to the fluorosilicone rubber composition (FSR).

TABLE 4

| FSR | +Pt catalyst | HCR | +Cross-linker (3) | Peel Force N/mm (Average) |
|---|---|---|---|---|
| 1 | No | HCR 1 | No | 0.50 |
| 2 | No | HCR 1 | No | 0.36 |
| 1 | Yes | HCR 1 | Yes | 3.23 |
| 2 | Yes | HCR 1 | Yes | 3.01 |

The results clearly show improved adhesion in the presence of crosslinker 3

Example 5

In this example samples were prepared as described above and the adhesion test used was the same but the platinum catalyst was incorporated into the fluorosilicone rubber composition and 1% by weight of a suitable HCR cross-linker, namely trimethyl terminated methyl hydrogen methyloctyl siloxane having a viscosity of about 50 mPa·s, was incorporated into the high consistency rubber composition.

TABLE 5

| FSR | +Pt catalyst | HCR | HCR Cross-linker | Peel Force N/mm (Average) |
|---|---|---|---|---|
| 1 | No | HCR 1 | No | 0.50 |
| 1 | Yes | HCR 1 | Yes | 1.24 |
| 2 | No | HCR 1 | No | 0.36 |
| 2 | Yes | HCR 1 | Yes | 1.08 |

Although the difference in adhesion results are not as great there is again a significant improvement in the peel force where the cross-linker and catalyst are both used. Again as seen in both Tables 1 and 2, it will be seen in Table 5 that samples containing the catalyst in the fluorosilicone layer and cross-linker in the high consistency rubber layer gave significantly higher peel force test results than samples in which both catalyst and cross-linker were omitted.

Example 6

In this example the sample preparation was altered in that a portion of fluorosilicone rubber 2, optionally with added platinum or crosslinker, was cured in a mould to give 2 mm thick sheets. A second portion of fluorosilicone rubber 2, optionally with added crosslinker or platinum, was formed into an uncured slab as described above. The cured and uncured sheets were then pressed together under a pressure of 100 bar ($10^7$ Pa) at 170° C. for 10 minutes. The same peel test as previously described was then carried out to assess the relative adhesion of the sheets to each other, the results being provided in Table 6 below.

TABLE 6

| Additive to Un-cured sheet of FSR 2 | Additive to Pre-cured Sheet of FSR 2 | Peel Force N/mm (Average) |
|---|---|---|
| None | None | 1.06 |
| None | Fluoro crosslinker | 1.04 |
| None | Platinum Catalyst | 1.08 |
| Fluoro crosslinker | None | 1.10 |
| Platinum Catalyst | Fluoro crosslinker | 1.12 |
| Fluoro crosslinker | Platinum Catalyst | 1.75 |

The results show that the combination of platinum catalyst in the pre-cured FSR sheet with fluorocrosslinker in the uncured sheet gives a significant improvement in adhesion compared to the absence of one or both of crosslinker and catalyst or to the case where the fluoro crosslinker is in the pre-cured layer and the platinum catalyst in the uncured layer.

Example 7

In this example the sample preparation was altered in that the fluorosilicone rubber and high consistency rubber slabs were individually cured in moulds to give 2 mm thick sheets. The sheets were then pressed together under a pressure of 100 bar at 170° C. for 20 minutes. The same peel test as previously described was then carried out to assess the relative adhesion of the sheets to each other, the results being provided in Table 7 below.

TABLE 7

| FSR Base | FSR Cross-linker (2) | HCR | +Pt catalyst | Peel Force N/mm (Average) |
|---|---|---|---|---|
| 1 | No | HCR 1 | No | 0.18 |
| 1 | Yes | HCR 1 | Yes | 0.11 |

In this no enhancement in adhesion was observed (in fact a decrease occurred).

Example 8

In this example the physical properties of samples of the fluorosilicone rubber containing a cross-linker in the form of 1% by weight of FSR cross-linker 1 were compared with samples prepared in the absence of FSR cross-linker 1 with respect to the physical properties of the cured fluorosilicone rubber both before and after aging in an oil for 7 days in accordance with ASTM D471-95.

Samples of the fluorosilicone rubber were prepared as described above. A series of test samples were used to assess the initial physical properties of the cured fluorosilicone rubbers and other samples were immersed in oil (Total MA-3 pre aged 16 h @ 150° C.) for 7 days at 175° C. After aging the samples were cleaned and tested to determine the relative change in physical properties after aging in oil. Results are provided below in Table 8. All the physical tests undertaken used the same methods as indicated below:

It will be noted that the elongation at break after aging FSR composition 3 is improved by the addition of cross-linker 1 and improvements were also seen in tensile strength.

TABLE 8

| Sample | Property | Initial | After Oil Aging | % Change |
|---|---|---|---|---|
| FSR Comp 3 (excluding + 1% by cross-linker) weight of cerium hydroxide | Hardness (Shore A) BS ISO EN 868: 2003 | 35.1 | 38.3 | 9% |
| | 100% Modulus (MPa) (ISO 37: 1994 Type 2) | 0.86 | 1.13 | 31% |
| | Tensile Strength (MPa) (ISO 37: 1994 Type 2) | 11.44 | 10.38 | −9% |
| | Elongation at Break (EB) (%) ISO 37: 1994 Type 2 | 588.6 | 505.5 | −14% |
| FSR Comp 3 including 1 % by weight of FSR cross-linker 1 | Hardness (Shore A) | 31.8 | 40 | 26% |
| | 100% Modulus (MPa) | 0.83 | 1.06 | 28% |
| | Tensile Strength (MPa) | 9.95 | 8.95 | −10% |
| | EB (%) | 571.2 | 552.4 | −3% |
| FSR Comp 2 | Hardness (Shore A) | 35.3 | 42.2 | 20% |
| | 100% Modulus (MPa) | 0.82 | 1.25 | 52% |
| | Tensile Strength (MPa) | 12.79 | 8.67 | −32% |
| | EB (%) | 521.7 | 407.9 | −22% |
| FSR Comp 2 + 1% by weight of FSR Cross-linker 1 | Hardness (Shore A) | 35.2 | 39 | 11% |
| | 100% Modulus (MPa) | 0.71 | 1.18 | 66% |
| | Tensile Strength (MPa) | 10.9 | 8.89 | −18% |
| | EB (%) | 532.16 | 413.6 | −22% |

The invention claimed is:

1. A method for the adhesion of a layer of fluorosilicone rubber which is curable using a non-hydrosilylation curing process to a layer of silicone rubber which contains substantially no perfluoroalkyl groups and which is curable using a non-hydrosilylation curing process, comprising the steps of:
   i) incorporating either a hydrosilylation catalyst or a siloxane containing at least two silicon bonded hydrogen groups into the fluorosilicone rubber composition prior to curing and;
   ii) incorporating the other of the hydrosilylation catalyst or the siloxane containing at least two silicon bonded hydrogen groups into the alternative silicone rubber composition prior to curing;
   iii) forming the products of step (i) and step (ii) into required shapes;
   iv) bringing the shaped products of step (iii) into contact with each other; and
   v) adhering the shaped products in contact with each other together by effecting a hydrosilylation reaction therebetween.

2. A method in accordance with claim 1 characterised in that either the product of step (i) or the product of step (ii) is pre-cured prior to step (v).

3. A method in accordance with claim 1 characterised in that both the product of step (i) and the product of step (ii) remain un-cured prior to step (v).

4. A method in accordance with claim 1 wherein pressure is applied on to the interface between the products of step (iii) prior to and/or during step (v).

5. A method in accordance with claim 1 characterised in that step (v) is undertaken at a temperature between room temperature up to about 200° C.

6. A method in accordance with claim 1 characterised in that the hydrosilylation catalyst is a platinum group metal based catalyst selected from a platinum, rhodium, iridium, palladium or ruthenium based catalyst.

7. A method in accordance with claim 1 characterised in that the silicon bonded hydrogen containing siloxane comprises silicon-bonded hydrogen atoms and substituted or non-substituted monovalent hydrocarbon groups or aryl groups; and has a linear, partially branched or cyclic molecular structure with a degree of polymerization greater than 5.

8. A method in accordance with claim 7 characterised in that the silicon bonded hydrogen containing siloxane is a linear structure with silicon bonded hydrogen radicals as represented by the formula wherein each R" may be the same or different and denotes a branched or linear perfluoroalkyl radical having from 1 to 8 carbon atoms, the value of r is zero or greater than zero and the values of t and z are each greater than zero and are such that the fluorosilicone polymer contains from 1 to 10 mol % hydrogen bonded siloxane units, at least 5 mol % fluorinated siloxane units and the balance dimethylsiloxane units and the chain-curing radicals as represented by the formula noted immediately above wherein the value of r is zero and the values of t and z are each greater than zero and are such that the fluorosilicone polymer contains from 20 to 50 mol % fluorinated siloxane units and has a viscosity of from 10 to 10000 mPa·s at 25° C.

9. A method in accordance with claim 1 characterised in that the silicon bonded hydrogen containing siloxane is contained in the fluorosilicone composition.

10. A method in accordance with claim 8 in that the silicon bonded hydrogen containing siloxane comprises:

wherein the viscosity of the polymer ranges from that of a freely flowing liquid to a slowly flowing gum and m and f have values of from zero to 10,000 and more.

11. A method in accordance with claim 1 wherein the fluorosilicone rubber composition comprises
   (A) 100 parts by weight of a polyorganosiloxane which has a degree of polymerization greater than 1000 and comprises fluorinated siloxane units, and non fluorinated siloxane units in the polymer; said fluorinated siloxane units having the formula $(R''Q)_a(R')_b SiO_{(4-a-b)/2}$ and said non-fluorinated siloxane units having the formula $(R')_c SiO_{(4-c)/2}$ where, in said fluorinated and non-fluorinated siloxane units, R" denotes a branched or linear perfluoroalkyl radical having from 1 to 8 carbon atoms, Q denotes a divalent hydrocarbon, hydrocarbon ether or hydrocarbon thioether radical linking the R" radical to a silicon atom through at least 2 carbon atoms, and R' denotes a saturated or unsaturated silicon-bonded, monovalent hydrocarbon group, wherein a=1 to 2, b=0-2 and c=0 to 3, (B) 5 to 200 parts by weight of a suitable filler;

(C) 0.1 to 10 parts by weight of an organic peroxide;

(D) 0 to 20 parts of a second polyorganosiloxane which has a degree of polymerization greater than 1000 and the average unit formula $R^2_y SiO_{(4-y)/2}$, in which $R^2$ is a substituted or non-substituted monovalent hydrocarbon group which may be unsaturated, but does not contain any fluoro substituents; and (E) a fluorosilicone polymer containing an average of at least two silicon-bonded hydrogen radicals per molecule.

12. A method in accordance with claim 1 characterised in that the silicone rubber composition which contains substantially no perfluoroalkyl groups is a high consistency silicone rubber based composition having a viscosity of greater than 1 000 000 mPa·s at 25° C.

13. A method in accordance with claim 12 characterised in that the silicone rubber composition comprises (i) an organopolysiloxane having a viscosity of at least 1,000,000 mPa·s (ii) a filler or group of fillers any of the types described in Component (B) in claim 11;

(iii) a curing agent of any type defined as Component (C) in claim 11; and optional additives selected from the group of one or more rheology modifiers, pigments, colouring agents, anti-adhesive agents, plasticizers, adhesion promoters, blowing agents, fire retardants and dessicants.

14. A method for the adhesion of a first layer of fluorosilicone rubber which is curable using a non-hydrosilylation curing process to a second layer of fluorosilicone and which is also curable using a non-hydrosilylation curing process, comprising the steps of:

i) incorporating either a hydrosilylation catalyst or a siloxane containing at least two silicon bonded hydrogen groups into the first fluorosilicone rubber composition prior to curing;

ii) incorporating the other of the hydrosilylation catalyst or the siloxane containing at least two silicon bonded hydrogen groups into the second fluorosilicone rubber composition prior to curing;

iii) forming the products of step (i) and step (ii) into required shapes;

iv) bringing the shaped products of step (iii) into contact with each other; and v) adhering the shaped products in contact with each other together by effecting a hydrosilylation reaction therebetween.

15. A hose comprising a fluorosilicone rubber adhered to silicone rubber by means of the method of claim 1.

16. A method in accordance with claim 7 characterised in that the silicon bonded hydrogen containing siloxane has degree of polymerization 10 to 150.

17. A method in accordance with 7 characterised in that the substituted or non-substituted monovalent hydrocarbon groups are $C_1$ to $C_{10}$ alkyl groups.

* * * * *